(12) United States Patent
Strömbäck et al.

(10) Patent No.: US 10,723,011 B2
(45) Date of Patent: Jul. 28, 2020

(54) POWER TOOL

(71) Applicant: HUSQVARNA AB, Huskvarna (SE)

(72) Inventors: Olle Strömbäck, Lerum (SE); Anders Köhler, Landvetter (SE)

(73) Assignee: HUSQVARNA AB, Huskvarna (SE)

( * ) Notice: Subject to any disclaimer, the term of this patent is extended or adjusted under 35 U.S.C. 154(b) by 34 days.

(21) Appl. No.: 15/969,248

(22) Filed: May 2, 2018

(65) Prior Publication Data

US 2018/0319004 A1    Nov. 8, 2018

(30) Foreign Application Priority Data

May 3, 2017   (SE) ..................................... 1750534

(51) Int. Cl.
| | |
|---|---|
| *B25F 5/02* | (2006.01) |
| *B23D 45/16* | (2006.01) |
| *B23D 47/12* | (2006.01) |
| *B27G 19/04* | (2006.01) |
| *B23D 59/02* | (2006.01) |

(52) U.S. Cl.
CPC .............. *B25F 5/02* (2013.01); *B23D 45/16* (2013.01); *B23D 47/12* (2013.01); *B27G 19/04* (2013.01); *B23D 59/02* (2013.01)

(58) Field of Classification Search
CPC ........ B23D 59/02; B23D 45/02; B23D 45/16; B23D 47/12; B23Q 11/08; B23Q 11/12; B27G 19/04; B25F 5/02; B24B 27/08
USPC ................ 30/375–377, 388–391; 125/12–15
See application file for complete search history.

(56) References Cited

U.S. PATENT DOCUMENTS

| | | | | |
|---|---|---|---|---|
| 3,583,106 A | * | 6/1971 | Dobbertin | B24B 27/08 30/390 |
| 3,735,489 A | * | 5/1973 | Zatorsky, Jr. | B27B 17/0016 30/390 |
| 3,893,240 A | * | 7/1975 | Morner | B24B 27/08 30/390 |
| 4,620,367 A | * | 11/1986 | Tubesing | B27B 17/0016 30/388 |

(Continued)

FOREIGN PATENT DOCUMENTS

| | | |
|---|---|---|
| CN | 201009013 Y | 1/2008 |
| CN | 205927332 U | 2/2017 |

(Continued)

OTHER PUBLICATIONS

Notice and International-Type Search Report for Swedish Application No. 1750534-8 dated Dec. 4, 2017.

*Primary Examiner* — Jason Daniel Prone
(74) *Attorney, Agent, or Firm* — Burr & Forman, LLP (57) ABSTRACT

The invention relates to a power tool including a support arm and a tool member supported at a first end of the support arm, where a drive motor at a second end of the support arm is arranged to power a drive belt that drives the tool member. The support arm comprises a frame member and a cover attached to the frame member, wherein the first end of the support arm further supporting a shield at least partially enclosing the tool member. A distance member is arranged between the frame member and the shield and extends radially at right angles to the drive shaft, wherein a radially outer portion of the distance member is spaced a predetermined distance(s) from the shield.

14 Claims, 6 Drawing Sheets

(56) References Cited

U.S. PATENT DOCUMENTS

| | | | | |
|---|---|---|---|---|
| 4,848,001 A * | 7/1989 | Clark | B23D 47/12 | 30/391 |
| 4,905,424 A * | 3/1990 | Nagashima | B24B 55/052 | 451/452 |
| 5,140,754 A * | 8/1992 | Martenson | B27G 19/04 | 30/390 |
| 5,730,561 A * | 3/1998 | Wambeke | B23D 45/16 | 30/390 |
| 5,862,594 A | 1/1999 | Söderqvist | | |
| 5,924,208 A * | 7/1999 | Saeki | B23D 61/10 | 30/388 |
| 5,940,976 A * | 8/1999 | Soderqvist | B23Q 11/0833 | 30/388 |
| 6,374,501 B1 * | 4/2002 | Claesson | B23D 47/123 | 30/389 |
| D533,757 S * | 12/2006 | Arvidsson | D8/66 | |
| 7,261,624 B2 * | 8/2007 | Wedel | B24B 27/08 | 30/390 |
| D596,912 S * | 7/2009 | Arvidsson | D8/66 | |
| 7,571,720 B2 * | 8/2009 | Donnerdal | B23D 47/12 | 30/388 |
| 8,215,295 B2 * | 7/2012 | Donnerdal | B23D 47/12 | 30/388 |
| 8,272,134 B2 * | 9/2012 | Soika | B23D 45/16 | 30/390 |
| 8,388,415 B2 * | 3/2013 | Soika | B23D 59/006 | 30/388 |
| 8,739,418 B2 * | 6/2014 | Okumi | B23D 45/16 | 30/390 |
| 8,793,885 B2 * | 8/2014 | Sugiyama | B23D 45/16 | 30/381 |
| 8,857,421 B2 * | 10/2014 | Kondo | B23D 59/006 | 30/390 |
| 8,898,913 B1 * | 12/2014 | Lones | B23D 45/16 | 125/13.03 |
| 8,939,857 B2 * | 1/2015 | Doering | B23D 47/12 | 474/112 |
| 8,998,684 B2 * | 4/2015 | Rosani | B23D 47/12 | 451/347 |
| 9,221,111 B2 | 12/2015 | Elfner et al. | | |
| 10,427,263 B2 * | 10/2019 | Nakaganna | B23Q 11/06 | |
| 10,434,586 B2 * | 10/2019 | Geromiller | B27B 17/025 | |
| 2001/0003983 A1 | 6/2001 | Iida et al. | | |
| 2005/0247179 A1 * | 11/2005 | Juhojuntti | B23D 47/123 | 30/389 |
| 2009/0013541 A1 * | 1/2009 | Amend | B24B 55/052 | 30/391 |
| 2009/0283286 A1 * | 11/2009 | Hoffmann | B23D 47/12 | 30/388 |
| 2010/0011598 A1 * | 1/2010 | Meixner | B24B 23/02 | 30/390 |
| 2014/0230211 A1 * | 8/2014 | Doering | B23D 47/12 | 30/276 |
| 2014/0360028 A1 * | 12/2014 | Boehme | B27B 9/02 | 30/377 |
| 2018/0205293 A1 * | 7/2018 | Kawakami | H02K 9/06 | |
| 2018/0281086 A1 * | 10/2018 | Greitmann | B23Q 11/0825 | |
| 2018/0355930 A1 * | 12/2018 | Schneider | B23D 45/16 | |
| 2018/0369939 A1 * | 12/2018 | Zimmerman | B23D 47/12 | |
| 2019/0070746 A1 * | 3/2019 | Hanussek | B23D 45/16 | |

FOREIGN PATENT DOCUMENTS

| | | |
|---|---|---|
| DE | 197 19 461 A1 | 11/1997 |
| EP | 2 832 497 A1 | 2/2015 |
| GB | 2 419 561 A | 5/2006 |
| JP | 2017-217794 A | 12/2017 |
| WO | 2013/187837 A2 | 12/2013 |

* cited by examiner

POWER TOOL

TECHNICAL FIELD

The invention generally relates to power tools such as hand-held motor-driven tools. More specifically, the invention relates to rotary cutters or saws with a cover that protects a tool driving mechanism from moisture.

BACKGROUND

When operating a power tool it is often necessary to supply a liquid, such as water, in order to bind dust and debris and/or to cool the workpiece being cut. The resulting spray of liquid during cutting causes soiling of the power tool supporting the tool member and may reduce the service life of components of the driving mechanism, such as a drive belt or braking means for stopping the tool member after a cut.

In order to avoid this, it is common to provide a guard or shield around the tool member and some form of cover enclosing the drive mechanism. Covers of this type must provide protection against moisture, but must also be possible to remove to provide access for servicing and repair of the drive mechanism. Such covers can be effective against indirect spray of liquid but may not always be sufficient for larger volumes of moisture in the form of liquid running down portions of the power tool.

Hence there is a need for a cover that is easily removed and provides improved protection from relatively large amounts of spray and running liquid.

SUMMARY

An objective of the invention is to provide a power tool that solves the above-mentioned problem. The objective is achieved by a power tool according to claim 1.

In the subsequent text, the term "coupled" is defined as connected, whether directly or indirectly through intervening components, and is not necessarily limited to physical connections. The connection can be such that the objects are either permanently connected or releasably connected, unless specifically stated. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. Terms such as "upper" and "lower" are used to define relative directions or locations of components and refer to such positions when the power tool is being supported by an operator when standing and holding the power tool in both hands. Similarly, terms such as "front" and "rear" are used to define relative directions or locations of components along the main extension of a support arm supporting a tool member. In this context, a drive motor for driving the tool member is located at the rear of the power tool, while the tool member is located at the front of the power tool.

According to one example, the invention relates to a power tool comprising a support arm and a tool member supported at a first end of the support arm. A drive motor is mounted at a second end of the support arm and is arranged to power a drive belt that drives the tool member. The drive motor can be an internal combustion engine, an AC or DC powered electric motor, or a similar suitable drive device. The support arm can comprise a frame member and a cover attached to the frame member. The frame member can extend from the first end to the second end of the support arm to provide structural stability to the power tool. The frame member and the cover are connected to form a belt chamber enclosing the drive belt, a belt tensioner and a drive belt pulley with a drive shaft for driving the tool member at the first end of the support arm. This first drive belt pulley can be provided with a brake mechanism to allow the tool member to be braked and stopped after a completed cut. A corresponding second drive belt pulley is provided at the second end of the support arm and is driven by the drive motor. The first end of the support arm is arranged to support a shield at least partially enclosing the tool member. The shield can be coupled to the support arm to allow it to be rotated over a predetermined angle about the drive shaft axis relative to the support arm.

According to the invention, a distance member is arranged between the frame member and the shield, which distance member extends radially in a plane at right angles to the drive shaft. At least one slip ring is supported between the distance member and the side of the shield. A radially outer portion of the distance member is spaced a predetermined distance from the shield. The spacing between the distance member and the shield forms a draining channel for liquid running down the side of the shield and prevents it from flowing onto the support arm and/or into the belt chamber. The draining channel can be partially annular, as the shield is only partially enclosing the tool member. The distance member is supported by the frame member and can be in contact with an edge portion of the cover along at least an upper part of the first end of the support arm. In locations where the distance member is in contact with the upper portion of the cover, it can extend a predetermined distance outside the edge portion of the cover where it is in contact with the distance member. The predetermined distance is measured at right angles to the edge of the cover in the plane of the distance member and can be at least 1 mm, more preferably selected in the range 1-15 mm depending on the size and type of power tool. The distance member can also extend a second predetermined distance outside the edge portion of the support arm in locations where the distance member is in contact with a lower portion of the first end of the support arm. The latter, second distance is equal to or larger than the above-mentioned predetermined distance. This arrangement ensures that liquid following the draining channel is guided downwards and away from the support arm, initially by the upper portion of the distance member and subsequently by a lower portion of the distance member. Liquid reaching the lower portion of the distance member will run off its lower portion without reaching the support arm. The distance member is mounted fixed against rotation onto the frame member. Non-limiting examples of suitable attachment means are cooperating, form-fitting projections/recesses, resilient snap-on connectors or fasteners, such as screws. Adhesive bonding or deformable fasteners are alternative options, although such methods would complicate replacement.

According to a further example, the distance member can comprise a flat annular section and an additional rear section extending a predetermined distance away from the first end of the support arm, in the general direction of the support arm. A protruding edge or lip can be arranged along at least an upper portion of the outer periphery of the distance member, which edge extends a predetermined distance towards the shield. The peripheral edge of the distance member extending outside the edge portion of the cover can have a longitudinal extension from the rearmost part of the upper portion of the distance member, which first location can be defined by a first angle measured from a reference plane through the axes of the pulleys, with a locus through the axis of the first pulley at the front of the support arm and with a reference angle extending forwards from the first pulley. The first location is positioned where an extension of this first angle intersects the upper portion of the distance member. The minimum extension of the edge portion of the distance member extends from this first location forwards to a second location determined by a second angle, covering a sector from the first to the second location along the upper portion of the distance member. The second angle determining the minimum extension can be dependent on the shape and size of the shield. The maximum extension of the edge portion of the distance member extends from the first location forwards to a third location determined by a third angle, covering a sector from the first to the third location along the upper portion of the distance member. The maximum extension can extend up to a front portion at the foremost tip of the first end of the support arm. Non-limiting examples of suitable angles for the minimum extension can be a sector enclosed between the angles 45° and 135° measured counter-clockwise from the reference angle. The maximum extension can be a sector enclosed between the angles 0° and 135° measured counter-clockwise from the reference angle.

By extending the length of the edge portion of the distance member the function of the draining channel can be improved even if the cutting tool is held with the support arm at an angle relative to a horizontal plane. The protruding edge can extend over part of or the entire extension of the peripheral edge of the distance member. The function of the protruding edge is to prevent liquid from "climbing" out of the draining channel and over the peripheral edge of the distance member in locations where the edge portion of the cover contacts the distance member.

In addition, a rear portion of the outer periphery of the distance member can be provided with a second protruding edge. The second protruding edge preferably forms a continuation of the first protruding edge described above. The function of the second protruding edge is to guide liquid from at least the draining channel down the side of a substantially flat rear portion of the distance member and towards the lower peripheral edge of the lower portion of the distance member. The protruding edge or lip preferably extends along a major part of the rear portion, wherein the edge can extend at least half way down the peripheral edge of the rear portion. As in the case of the first protruding edge along the upper portion of the distance member, this second protruding edge or lip extends a predetermined distance c towards the shield.

According to a further alternative example the upper portion of a distance member can, in addition to a protruding edge, be provided with a deflector extending out of the plane of the distance member in the opposite direction of the protruding edge. The deflector is arranged at an acute angle out of the plane of the distance member, which angle can be selected in the range 10° to 60°, more preferably within the range 20° to 45°. The deflector is arranged to extend a predetermined distance away from the upper portion of the distance member, which distance is selected in the range 5-50 mm. The acute angle and the predetermined distance are selected depending on the size of the power tool and its intended use. For instance, a larger power tool can be provided with a larger deflector, as the amount of liquid spray is likely to be larger According to a further example, the cover comprises a first surface, or side surface, arranged parallel with and adjacent the drive belt pulley, facing away from the tool member. A second surface, or edge surface, is arranged along the extension of the drive belt within the belt chamber and extending in a lateral direction between the first surface and the frame member. A portion of the second surface of the cover can extend over at least a part of the outer periphery of the frame member and into contact with the distance member at the first end of the support arm. By allowing the second surface to overlap a peripheral edge surface of the frame member, a moisture resistant seal can be provided between the component parts along the extension of the support arm. Further, by allowing a portion of the second surface of the cover to come into contact with the distance member at the first end of the support arm, moisture resistance is improved further in the region of the power tool with the highest exposure to liquid spray.

In order to attach the cover to the frame member, the frame member comprises at least one threaded fixing member for the cover, which fixing member extends away from the tool member parallel to the axis of the drive shaft for the drive belt pulley. The cover can have one, two, or three or more fasteners, such as nuts, configured to secure the cover to the frame member. The number of fasteners can depend on the location, size, and shape of the cover. The size of the power tool, the size of each fastener, and the necessary securement can further influence the number of fasteners to be implemented. In at least one example, the guard cover can be secured by one fastener. In another example, the guard cover can be secured by at least three fasteners. In at least one example, the guard cover can have at least three fasteners with the third fastener being offset from the first and second fasteners. Preferably, the cover is assembled onto the frame member in a direction at right angles to the plane of the tool member, i.e. in a direction parallel to the at least one fixing member.

The cover can further include at least one through recess formed between an inner surface and an outer surface of the side surface of the cover. The at least one through recess can be configured to receive a corresponding threaded fixing member, such as a bolt or screw or threaded stud, and a threaded fastener for engaging the threaded member. In at least one example, the cover can include a plurality of through recesses formed therein, each configured to receive a corresponding threaded member and threaded nut for engaging the corresponding threaded member. The number of threaded members and nuts can vary depending on the size of the cover, the arrangement of the cover, the size of the threaded member, the size of the nut, and other factors configured to ensure a secure arrangement between the cover and the power tool.

The cover can comprise a single or several cover sections. In the subsequent text, examples will be given for covers comprising two sections, but the invention is not limited to the use of only two cover sections. According to one example, the cover can comprise a first cover section at the first end of the support arm and a second cover section at the second end adjacent the drive motor. The first cover section is removably mounted onto the at least one threaded fixing member on the frame member. At least the first cover section comprises at least one captive fastener cooperating with a corresponding threaded fixing member.

The side surface of the first cover section provides means for retaining the at least one fastener or nut when it is loosened from its fixing member. When a power tool includes a cover as described herein, the fasteners can be loosened from an installed configuration so that the cover can be removed. Additionally, the captive fasteners are retained by the cover to prevent the fasteners from becoming lost or misplaced. The retention device for the one or more fasteners as presented herein includes a receiving portion and a retaining cover in the side surface of the cover. The receiving portion can have a depth to accommodate the full height of the fastener, such that in an installed configuration no portion of the fastener extends through the through holes. In an uninstalled configuration, the fastener, though captively held within the receiving portion, can move within the depth of the receiving portion. The receiving portion can be integrally formed with the guard cover.

A power tool as described above has the advantage of providing improved protection against moisture, while facilitating easy removal of the cover to provide access for servicing and repair of the drive mechanism. The cover provides effective protection against both indirect spray of liquid as well as larger volumes of moisture in the form of liquid running down portions such as the shield of the power tool. The advantages are achieved by a draining channel between the shield enclosing the tool member and a distance member on the supporting arm, which channel guides liquid running down the side of the shield past the support arm and prevents it from flowing onto the support arm and/or into the belt chamber. The distance member is further arranged to prevent liquid from "climbing" out of the draining channel and over the peripheral edge of the di stance member.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
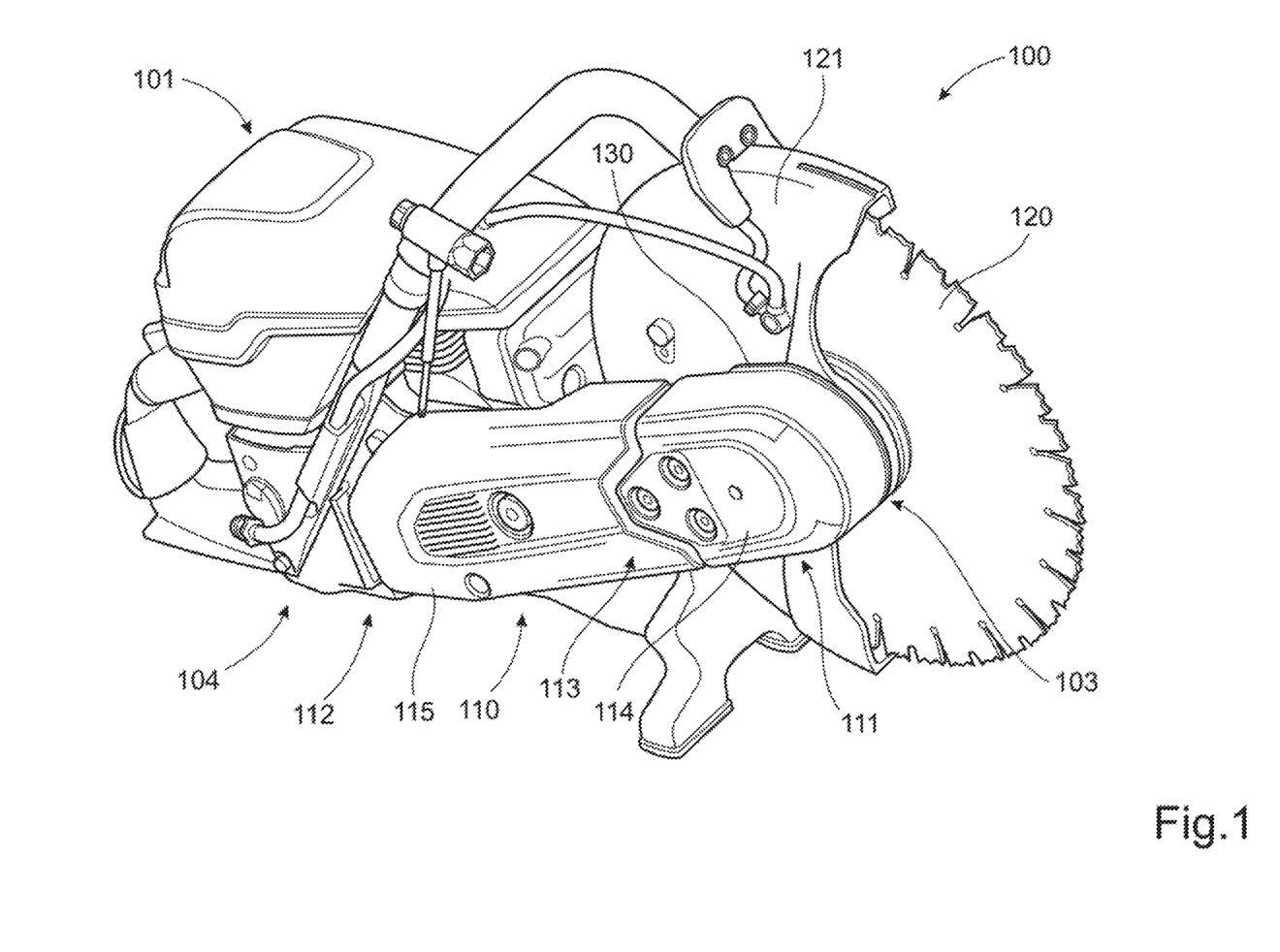
FIG. 1 shows a perspective view of a power tool according to the invention.

FIG. 1 shows a perspective view of a power tool 100 comprising a support arm 110 and a tool member 120 supported at a first end 111 of the support arm 110. A drive motor 101 is mounted at a second end 112 of the support arm 110 and is arranged to power a drive belt (see FIGS. 2A & 3) that drives the tool member 120. The drive motor 101 can be an internal combustion engine, an AC or DC powered electric motor or a similar suitable drive device. The support arm 110 comprises a frame member (see FIG. 3) and a cover 113 attached to the frame member. In this example, the cover 113 comprises a first cover section 114 removably attached to the first end 111 of the support arm 110 and a second cover section 115 removably attached to the second end 112 of the support arm 110. The frame member is connected to a frame that is connected to the drive motor 101 and extends from the first end 111 to the second end 112 of the support arm 110 to provide structural stability to the power tool 100. The frame member and the cover 113 are connected to form a belt chamber enclosing the drive belt, a belt tensioner and a first drive belt pulley 103; with a drive shaft for driving the tool member 120 at the first end 111 of the support arm 110. This first drive belt pulley 103 can be provided with a brake to allow the tool member 120 to be braked and stopped after a completed cut. A corresponding, second drive belt pulley 104 is provided at the second end 112 of the support arm 110 and is driven by the drive motor 101. The first end 111 of the support arm 110 is arranged to support a shield 121 at least partially enclosing the tool member 120. The shield 121 is coupled to the support arm 110 to allow it to be rotated over a predetermined angle about the drive shaft axis X (see FIGS. 2A & 3) relative to the support arm 110.

Figure 2A:
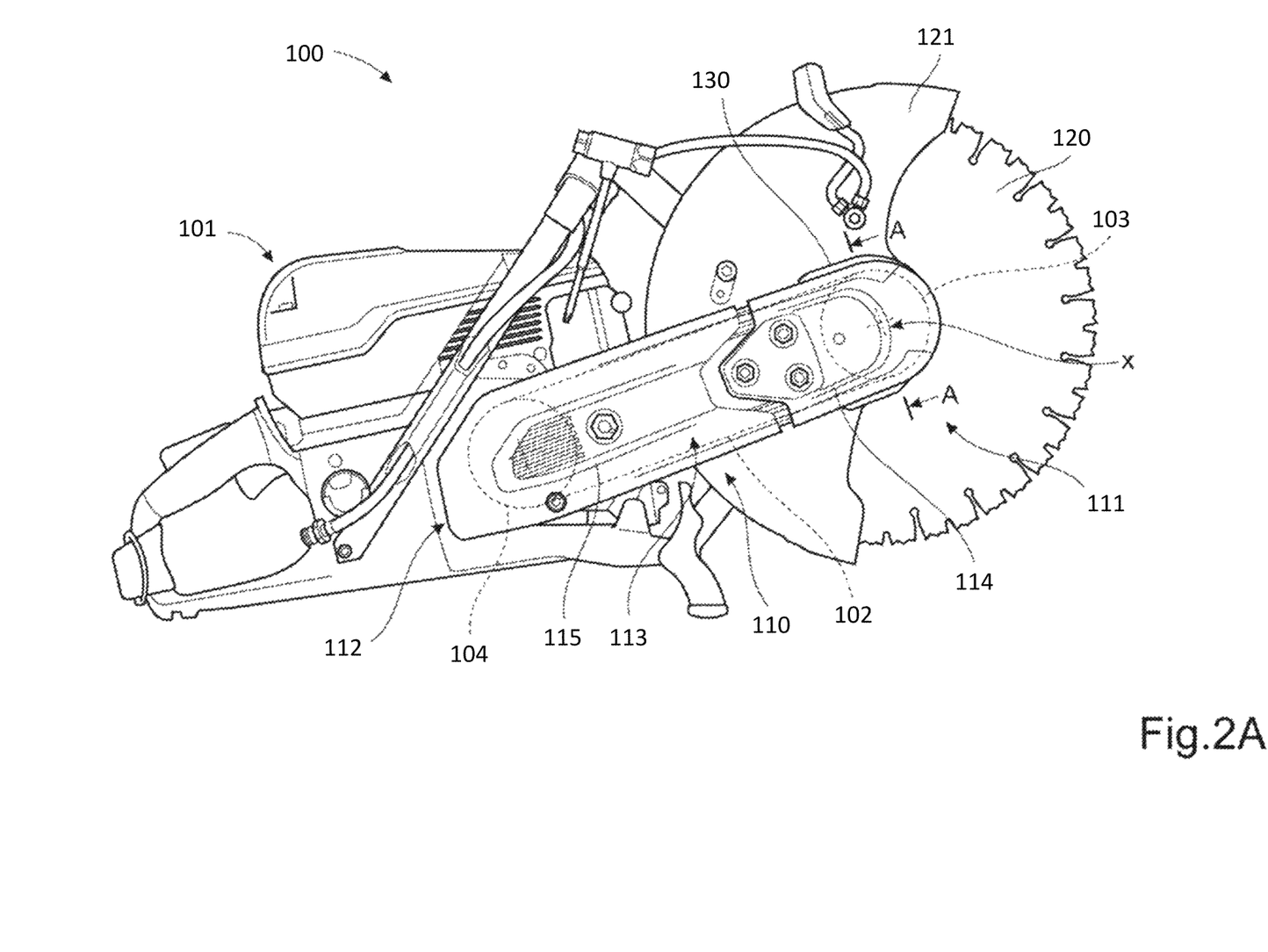
FIG. 2A shows a side view of a power tool according to the invention.

FIG. 2A shows a side view of the power tool in FIG. 1. FIG. 2A indicates the power tool 100 comprising the support arm 110 and the tool member 120 supported at the first end 111 of the support arm 110. The drive motor 101 is mounted at the second end 112 of the support arm 110 and is arranged to power a drive belt 102 (indicated with dashed lines; see FIG. 3) that drives the tool member 120. The support arm 110 comprises the structural frame member (see FIG. 3) and the cover 113 attached to the frame member. The belt chamber is formed by the frame member and the cover 113 which are connected to enclose the drive belt 102 (indicated in dashed lines), a belt tensioner (not shown) and the first and second drive belt pulleys 103, 104 (indicated in dashed lines). The drive shaft (see FIG. 3) for driving the tool member 120 is located at the first end 111 of the support arm 110. The second drive belt pulley 104 provided at the second end 112 of the support arm 110 and is driven by the drive motor 101. The first end 111 of the support arm 110 supports the shield 121, and shield 121 is coupled to the support arm 110, to allow the shield 121 to be rotated over a predetermined angle about the drive shaft axis X relative to the support arm 110. A distance member 130 is arranged between the frame member (see FIG. 3) and the shield 121, which distance member 130 extends radially in a plane at right angles to the axis X of the drive shaft.

Figure 2B:
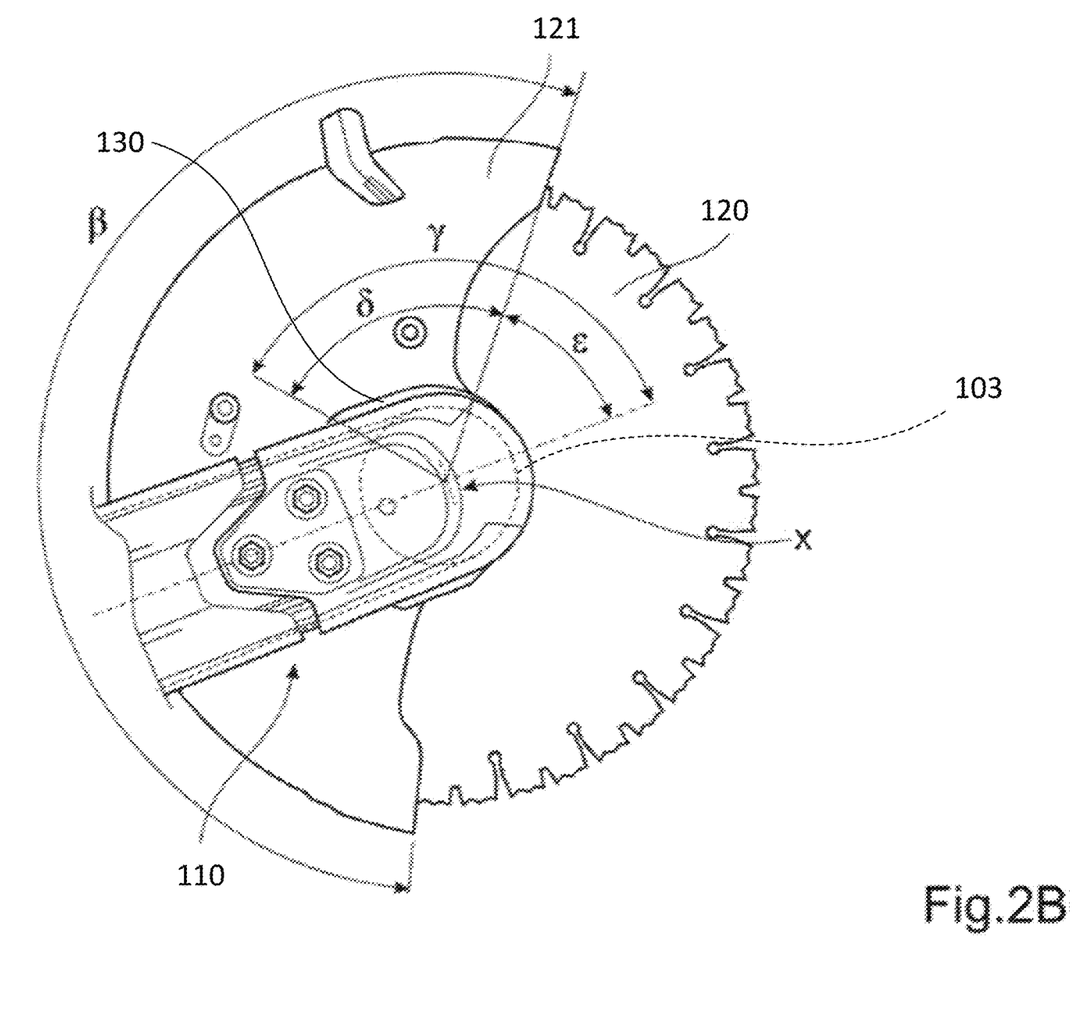
FIG. 2B shows an enlarged side view of the power tool in FIG. 2A.

FIG. 2B shows an enlarged side view of the power tool 100 in FIG. 2A. FIG. 2B illustrates a longitudinal axis corresponding to a plane through the axes of the pulleys in the support arm 110. The figure also shows the distance member 130 having a peripheral edge extending above the front and upper portion of the support arm 110.

The peripheral edge has a longitudinal extension along its outer periphery that can be selected between a minimum and a maximum value. The extension is defined by a position on the rearmost part of the upper portion of the distance member, which first location is defined by a first angle measured from a plane through the axes of the pulleys, with a locus through the axis of the first pulley at the front of the support arm 110 and with a reference angle extending forwards from the first drive belt pulley 103. In this example, the first angle (δ+ε) is approximately 135° measured counter-clockwise from the reference plane. The minimum extension of the peripheral edge extends from this first location forwards to a second location determined by a second angle ε, covering a sector enclosing the angle δ from the first to the second location. In this example, the second angle ε is approximately 45° measured counter-clockwise from the reference plane. Hence, the sector encloses an angle δ equal to 90° and the second angle, determining the minimum extension, can be dependent on the shape and size of the shield 121. The maximum extension of the peripheral edge extends from the first location forwards to a third location determined by a third angle γ, covering a sector from the first to the third location. The maximum extension can extend up to a front portion at the foremost tip of the first end 111 of the support arm 121. In this example, the sector enclosed by the third angle γ is approximately 135° measured counter-clockwise from the reference angle.

Figure 3:
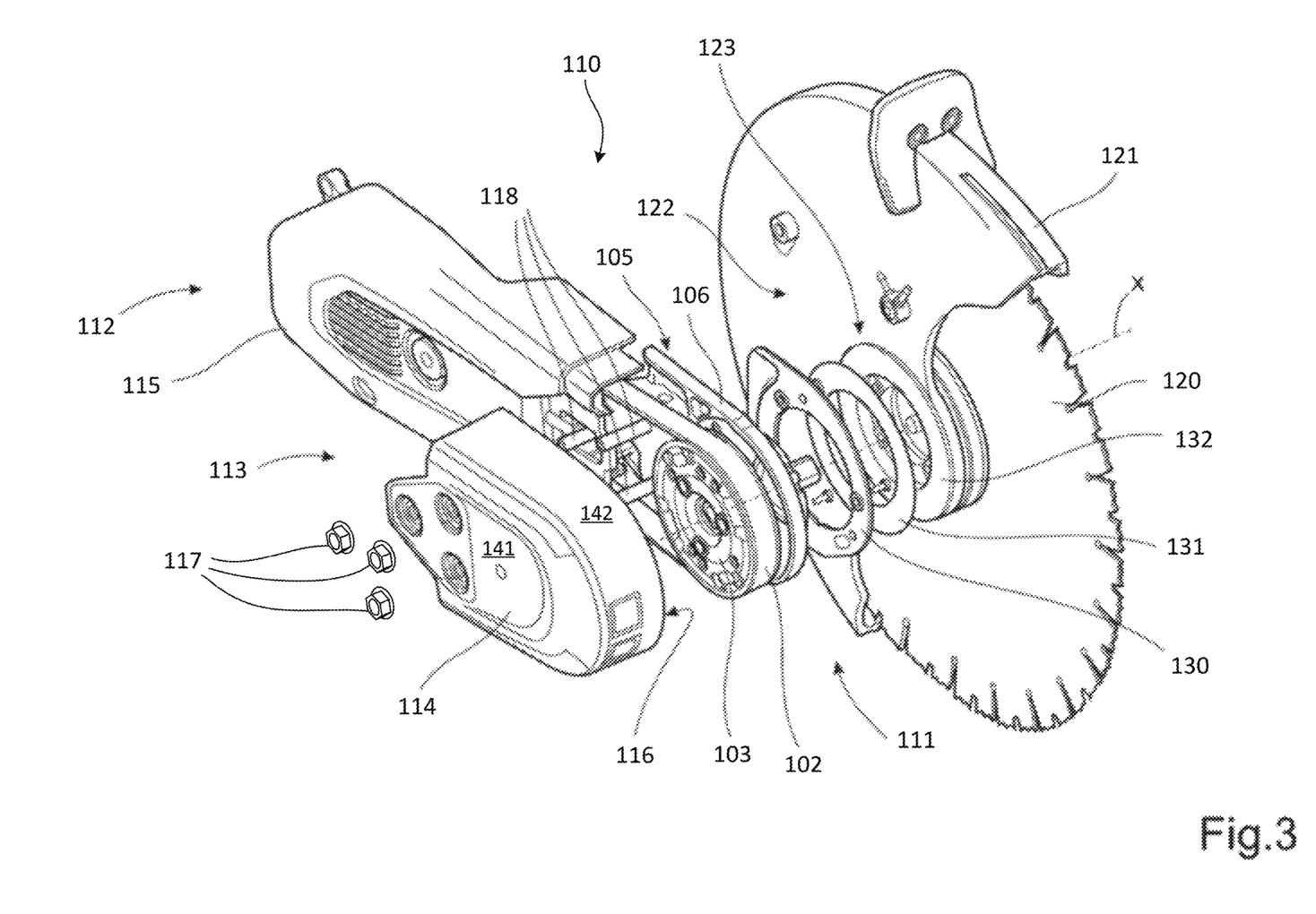
FIG. 3 shows an exploded perspective view of a support arm according to the invention.

FIG. 3 shows an exploded perspective view of the support arm 110 in FIG. 1. The figure shows the support arm 110 and the tool member 120 supported at the first end 111 of the support arm 110. The support arm 110 comprises the frame member 105 and the cover 113 attached to the frame member 105. The cover 113 comprises a first surface 141, or side surface, arranged parallel with and adjacent the drive belt pulley, facing away from the tool member 120. A second surface 142, or edge surface, is arranged along the extension of the drive belt 102 within the belt chamber and extending in a lateral direction between the first surface 141 and the frame member 105. A portion of the second surface 142 of the cover 113 can extend over at least a part of the outer periphery of the frame member 105 and into contact with the distance member 130 at the first end 111 of the support arm 110. When assembled, an edge portion 116 of the first cover section 114 extends over a peripheral edge portion 106 of the frame member 105. The frame member 105 and the cover 113 form a belt chamber enclosing the drive belt 102, the first drive belt pulley 103 and the second drive belt pulley (see FIG. 2A). The cover 113 comprises the first cover section 114 removably attached to the first end 111 of the support arm 110 and a second cover section 115 removably attached to the second end 112 of the support arm 110. The first cover section 114 is shown removed from the support arm 110 to expose the first drive belt pulley 103 and the drive belt 102.

The side surface of the first cover section 114 provides means for retaining a number of fasteners when the fasteners 117 are loosened from corresponding threaded fixing members 118 located on the frame member 105. The fasteners 117 can be loosened from an installed configuration (see FIG. 1) so that the cover can be removed (see FIG. 3). The captive fasteners 117 are retained by the first cover section 114 to prevent the fasteners 117 from becoming lost or misplaced. The retention device for the one or more fasteners 117 as presented herein includes a receiving portion and a retaining cover in the side surface of the first cover section 114. The receiving portion can have a depth to accommodate the full height of each fastener 117, such that, in an installed configuration, no portion of the fasteners 117 extends through the through holes. In an uninstalled configuration, the fasteners 117, though captively held within the receiving portion, can move within the depth of the receiving portion.

The example shown in FIG. 3 illustrates fasteners 117 in the form of nuts arranged to cooperate with threaded fixing members 118, which may be screws, fixed to the frame member 105. Each nut comprises a head having an outer end shaped to cooperate with a suitable tool and an adjacent, enlarged portion. The outer end of the head can be accessed through holes in the first cover section 114. The dimension of each hole is smaller than the dimensions of the respective enlarged portion of the head, allowing the nuts to be retained in the receiving portion. The receiving portion can be integrally formed with the first cover section 114. According to an alternative example, the fasteners 117 held captive in the cover can be screws. In this example, the screws are arranged to cooperate with threaded bores located in projecting members extending from and fixed to the frame.

FIG. 3 further shows the distance member 130 arranged between the frame member 105 and a first side 122 the shield 121 facing the frame member 105. The distance member 130 extends radially in a plane at right angles to the drive shaft axis X. In this example, a slip ring 131 is supported between the distance member 130 and a resilient member 132. The resilient member 132 is supported by a central portion 123 of the side 122 of the shield 121. A radially outer portion of the distance member 130 is spaced a predetermined distance from the shield 121 (see FIG. 5A). The spacing (see FIG. 5A) between the distance member 130 and the shield 121 forms a draining channel 150 for liquid running down the side of the shield 121 and prevents it from flowing onto the support arm 110 and/or into the belt chamber formed by the first cover section 114 and the frame member 105. The draining channel is partially annular, as the shield 121 only encloses the tool member 120 over a predetermined arcuate sector β (see FIG. 2B). The sector β shown in FIG. 2B is approximately 200°. Over the remaining arcuate section, any liquid present will be thrown radially outwards by the rotating tool member 120. The distance member 130 is supported by the frame member 105 and is in contact with the edge portion 116 of the first cover section 114 along at least a part of the first end 111 of the support arm 110. In locations where the distance member 330 is in contact with the first cover section 114, it can extend a predetermined radial distance (see FIG. 5A) outside the edge portion 116 of the first cover section 114 contacting the distance member 130. The predetermined distance is measured in the radial plane of the distance member 130 relative to the axis X. The predetermined distance can be selected in the range 1-5 mm depending on the size and type of power tool.

Figure 4A:
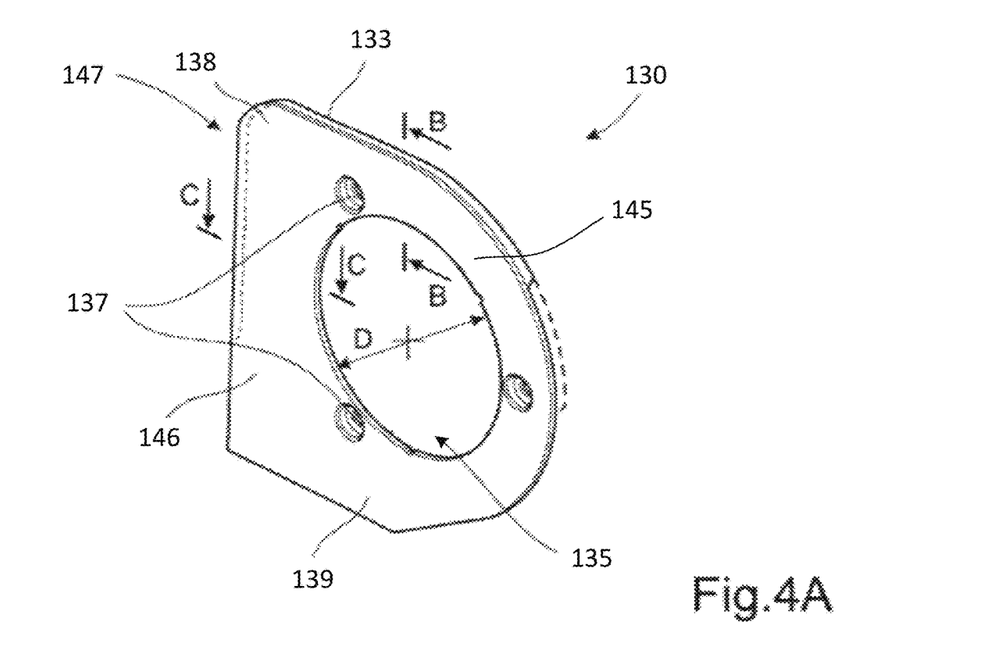
FIG. 4A shows a perspective view of a distance member according to the invention.

FIG. 4A shows a perspective view of a distance member 130 according to the invention. In this example, the distance member 130 comprises a flat annular section 145 and optionally an additional rear portion 146 extending a predetermined distance away from the first end 111 of the support arm 110 (see FIG. 2A), towards the second end 112 of the support arm 110 (see FIG. 2A) in the general direction of the support arm 110. According to a preferred example, a protruding edge 133 (or lip) is arranged along at least an upper, outer periphery portion 138 of the of the distance member 130, which edge 133 extends a predetermined distance d towards the shield (see FIGS. 4B & 5A). The central opening 135 provides an aperture through which the tool member can be connected to the drive shaft and the shield 121 can be rotatably coupled to the frame member 105 (see FIG. 5A). The distance member 130 is provided with holes 137 for fasteners, allowing the distance member 130 to be mounted and fixed against rotation onto the frame member 105 (see FIG. 3). Non-limiting examples of alternative attachment means are cooperating, form-fitting projections/recesses, resilient snap-on connectors or fasteners, such as screws.

Figure 4B:
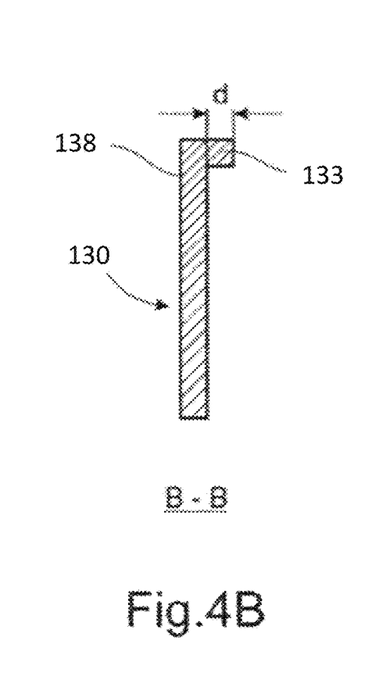
FIG. 4B shows a partial cross-section B-B of the distance member in FIG. 4A.

FIG. 4B shows a partial cross-section B-B of an upper portion 138 the distance member 130 in FIG. 4A, indicating the location of the protruding edge 133. The function of the protruding edge 133 is to prevent liquid from "climbing" out of the draining channel. This "climbing" would continue up the side of the substantially flat annular section 145 of the distance member 130 and over the upper peripheral edge of the distance member 130; in locations where an edge portion 116 of the cover 113 contacts the distance member 130 (see FIG. 3). The protruding edge 133 (or lip) is arranged along a part of or over the entire upper, outer periphery portion 138 of the distance member 130 and extends a predetermined distance d towards the shield 121. The predetermined distance d is measured substantially at right angles to the distance member 130 and can be at least 1 mm, more preferably selected in the range 1-5 mm depending on the available space between the distance member 130 and the shield 121.

Figure 4C:
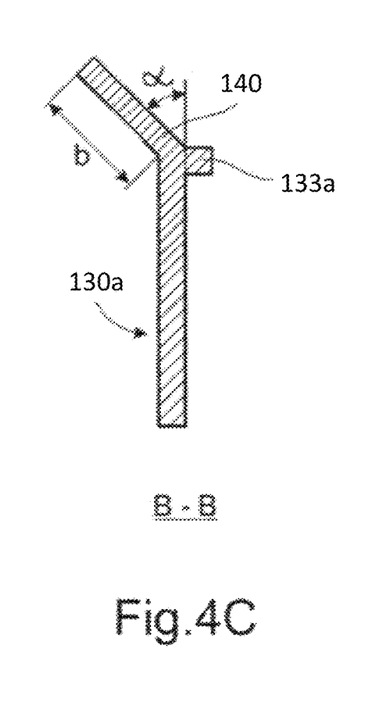
FIG. 4C shows a partial cross-section of an alternative distance member.

FIG. 4C shows a partial cross-section of an alternative example of the upper portion of a distance member 130a. In addition to a protruding edge 133a the distance member 130a is provided with a deflector 140 extending out of the plane of the distance member 130a in the opposite direction of the protruding edge 133a. The deflector 140 is arranged at an acute angle α out of the plane of the distance member 130a, which angle is selected in the range 10° to 60°, more preferably within the range 20° to 45°. The deflector 140 is arranged to extend a predetermined distance b away from the upper portion of the distance member 130a, which distance b is selected in the range 5-50 mm. The angle α and the predetermined distance b are selected depending on the size of the power tool and its intended use. For instance, a larger power tool can be provided with a larger deflector 140, as the amount of liquid spray is likely to be larger.

Figure 4D:
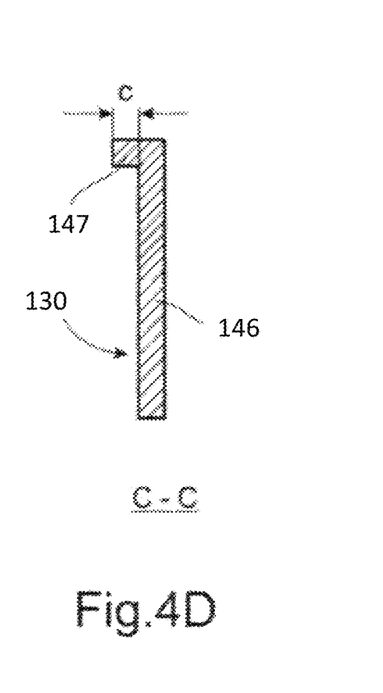
FIG. 4D shows a partial cross-section C-C of the distance member in FIG. 4A.

FIG. 4D shows a partial cross-section C-C of a rear portion 146 of the distance member 130 in FIG. 4A, indicating the location of a second protruding edge 147. The second protruding edge 147 preferably forms a continuation of the first protruding edge 133 or 133a described in FIGS. 4A and 4B above, respectively. The function of the second protruding edge 147 is to guide liquid from at least the draining channel down the side of the substantially flat rear portion 146 of the distance member 130 and towards the lower peripheral edge of the lower portion 139 of the distance member 130. The protruding edge 147 (or lip) extends along a major part of the rear portion 146, wherein the protruding edge 147 extends at least half way down the peripheral edge of the rear portion 146. The protruding edge 147 (or lip) extends a predetermined distance "c" towards the shield 121. The predetermined distance "c" is measured substantially at right angles to the plane of the distance member 130 and can be at least 0.2 mm, more preferably selected in the range 0.4 mm to 5 mm depending on the available space between the rear portion 146 of the distance member 130 and the shield 121.

The protruding edges 133, 133a, and 147 described in connection with FIGS. 4A-4D have been schematically illustrated as having rectangular cross-section. However, within the scope of the invention, these edges can be given any suitable cross-sectional shape that provides the desired liquid guiding function.

Figure 5A:
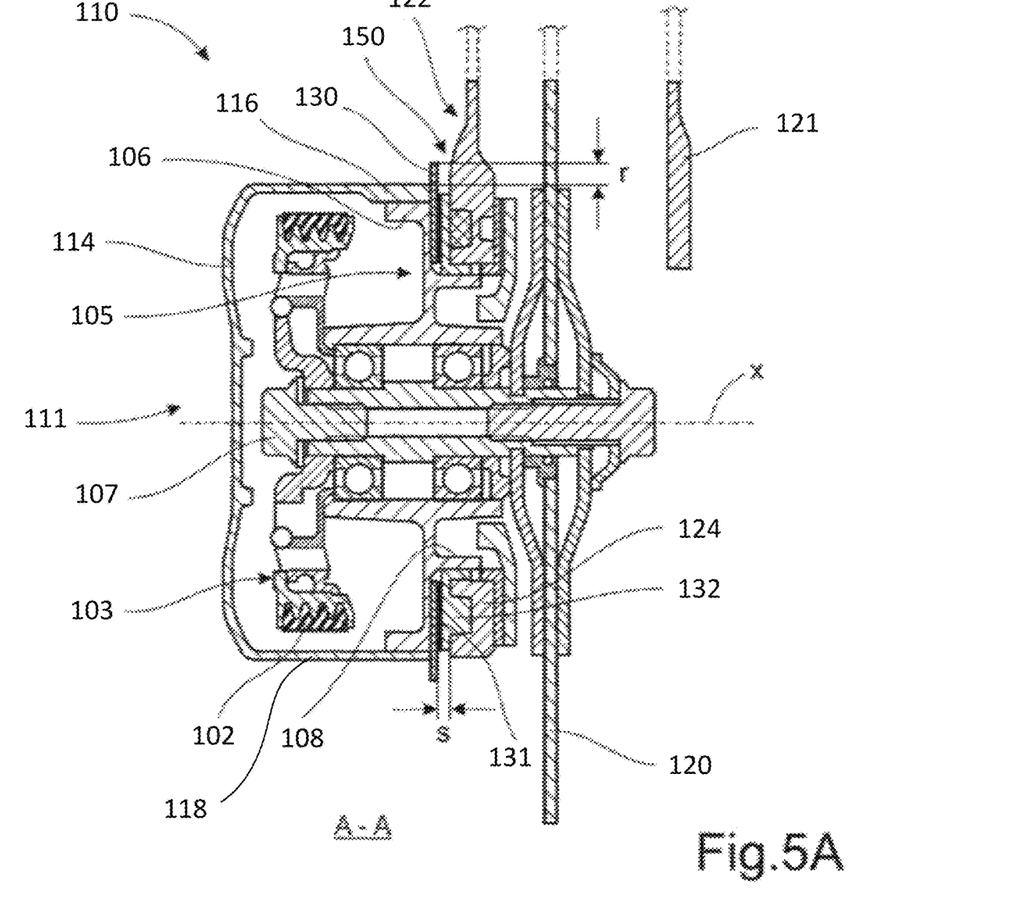
FIG. 5A shows a cross-section A-A of the first end of the support arm in FIG. 2A.

FIG. 5A shows a cross-section A-A of the first end 111 of the support arm 110 in FIG. 2A, in a plane through the axis X of the drive shaft 107 for the drive belt pulley 103 for the drive belt 102. The first end 111 of the support arm 110 comprises the frame member 105 and the first cover section 114 attached to the frame member 105. When assembled, the edge portion 116 of the first cover section 114 extends over a peripheral edge portion 106 of the frame member 105. The frame member 105 and the first cover section 114 forms a belt chamber enclosing the drive belt 102 and the first drive belt pulley 103.

FIG. 5A further shows the distance member 130 arranged between the frame member 105 and a first side 122 the shield 121 facing the frame member 105. The distance member 130 extends radially in a plane at right angles to the drive shaft axis X. In this example, a slip ring 131 is supported between the distance member 130 and a resilient member 132 supported by a central portion 124 of the shield 121. A radially outer portion of the distance member 130 is spaced a predetermined distance s from the shield 121. The spacing s between the distance member 130 and the shield 121 forms a draining channel 150 for liquid running down the side of the shield 121 and prevents it from flowing onto the support arm 110 and/or into the belt chamber formed by the first cover section 114 and the frame member 105. The draining channel 150 is partially annular, as the shield 121 only encloses the tool member 120 over a predetermined arcuate section (see FIG. 2A). Over the remaining arcuate section, any liquid present will be thrown radially outwards by the rotating tool member 120. The distance member 130 is mounted onto and supported by an annular ledge 108 extending from the frame member 105 towards the tool member 120. The distance member 130 is in contact with the edge portion 116 of the first cover section 114 along at least a part of the first end 111 of the support arm 110. In locations where the upper, outer periphery portion 138 of the distance member 130 (see FIG. 4A) is in contact with the first cover section 114, the distance member 130 can extend a predetermined radial distance r outside the edge portion 116 of the first cover section 114 contacting the distance member 130. The predetermined radial distance r is measured in the radial plane of the distance member 130 relative to the axis X. The predetermined distance can be selected in the range 1-5 mm depending on the size and type of power tool. The distance member 130 can also extend a predetermined distance outside the edge portion 116 in locations where the distance member 130 is in contact with a lower portion 118 of the first cover section 114. This distance is equal to or larger than the radial distance r. This arrangement ensures that liquid following the draining channel 150 is guided downwards and away from the support arm 110, initially by the upper portion 138 (see FIG. 4A) of the distance member 130 and subsequently by a lower portion 139 (see FIG. 5B) of the distance member 130. The figure also indicates attachment means for mounting the shield 121 onto the support arm 110 and clamping means for attaching the tool member 120 to the drive shaft 107. These features are not part of the invention as such and will not be described in further detail here.

Figure 5B:
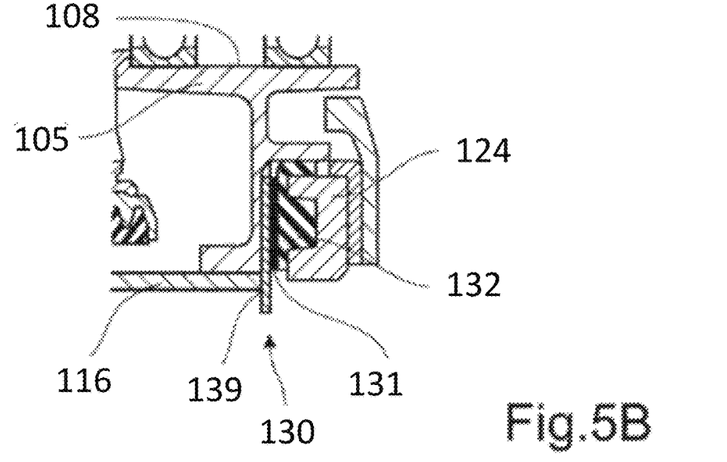
FIG. 5B shows an enlarged view of an assembly in FIG. 5A.

FIG. 5B shows an enlarged view of a portion of FIG. 5A, adjacent the lower portion of the distance member 130. In the direction from the frame member 105 towards the tool member 120, the assembly comprises the distance member 130, the slip ring 131 and a resilient member 132. In the example shown, the slip ring 131 is a separate component, supported between the distance member 130; acting as a slip ring holder and the resilient member 132. Alternatively, the slip ring 131 can be integrated into either the distance member 130 or the resilient member 132. This can be achieved by either, injection moulding or adhesive bonding during manufacturing of the distance member 130 or the resilient member 132. According to a further alternative, the function of the slip ring 131 can be performed by applying a suitable coating on one or both facing components. The resilient member 132 supported by a central portion 124 of the shield 121 and is mounted in one or more recesses in the central portion 124 to prevent it from rotating. The central portion 124 of the shield comprises an opening through which the drive shaft 107 extends. The purpose of the resilient member 132 is to prevent or reduce the transmission of vibrations from the tool member 120 to the support arm 110. The assembly also provides a means for adjusting the angular position of the shield 121 about the cutting member, while at the same time holding the shield 121 in the selected position.

It is to be understood that the present invention is not limited to the embodiments described above and illustrated in the drawings; rather, the skilled person will recognize that many changes and modifications may be made within the scope of the appended claims.

The invention claimed is:

1. A power tool comprising:
   a support arm, the support arm being elongate and having a first end and a second end that is disposed opposite the first end;
   a tool member supported at a first end of the support arm;
   a drive belt;
   a drive belt pulley;
   a drive shaft;
   a drive motor; and
   a shield;
   wherein the drive motor is disposed at the second end of the support arm and the drive motor is arranged to power the drive belt to drives the tool member via coupling of the drive belt to the drive belt pulley, coupling of the drive belt pulley to the drive shaft, and coupling of the drive shaft to the tool member;
   the support arm comprising a frame member and a cover attached to the frame member via fasteners, the frame member and the cover defining the first end of the support arm and the second end of the support arm;
   the frame member and the cover forming a belt chamber enclosing the drive belt and a first drive belt pulley with a drive shaft for driving the tool member;
   the support arm further supporting the shield at the first end, the shield at least partially enclosing the tool member;
   wherein the power tool further comprises a distance member arranged between the frame member and a side portion of the shield and the distance member extends in a plane defined by the distance member at right angles to the drive shaft;
   wherein a peripheral edge portion of the distance member is spaced a predetermined distance from the shield along a direction parallel to a rotational axis of the drive shaft;
   wherein the distance member is in contact with an edge portion of the cover along at least a part of the first end of the support arm.

2. A power tool according to claim 1, wherein a space between the distance member and a side portion of the shield forms a draining channel.

3. A power tool according to claim 1, characterized in that the distance member extends a second predetermined distance outside the edge portion of the cover contacting the distance member.

4. A power tool according to claim 1, wherein the distance member comprises a flat annular section that engages the frame member and an additional rear section that extends a second predetermined distance away from the first end of the support arm.

5. A power tool according to claim 1, wherein the distance member comprises a protruding edge, the protruding edge being arranged along at least an upper portion of the outer periphery of the distance member, the protruding edge extending a second predetermined distance towards the shield.

6. A power tool according to claim 1, wherein the distance member is mounted fixed against rotation on the frame member via holes in the distance member that engage with the frame member.

7. A power tool according to claim 1, wherein the cover comprises a first surface arranged parallel with and adjacent a rotational plane of the drive belt pulley and a second surface extending between the first surface and the frame member.

8. A power tool according to claim 1, characterized in that the frame member comprises threaded fixing members configured to engage with the fasteners to attach the cover to the frame member, which threaded fixing members are elongated in a direction parallel to the axis of the drive shaft for the drive belt pulley.

9. A power tool according to claim 8, wherein the cover is disposed at the first end of the support arm or at the second end adjacent the drive motor.

10. A power tool according to claim 9, wherein the cover is removably mounted onto the threaded fixing members on the frame member via engagement with the fasteners.

11. A power tool comprising:
    a support arm, the support arm being elongate and having a first end and a second end that is disposed opposite the first end;
    a tool member supported at the first end of the support arm;
    a drive belt;
    a drive belt pulley, the drive belt pulley defining a rotational axis;
    a drive shaft that rotates about the rotational axis;
    a drive motor; and
    a shield;
    wherein the drive motor is disposed at the second end of the support arm and the drive motor is arranged to power the drive belt to drive the tool member via coupling of the drive belt to the drive belt pulley, coupling of the drive belt pulley to the drive shaft, and coupling of the drive shaft to the tool member;
    the support arm comprising a frame member and a cover attached to the frame member via fasteners, the frame member and the cover defining the first end of the support arm;
    the frame member and the cover forming a belt chamber enclosing the drive belt and a first drive belt pulley with a drive shaft for driving the tool member;
    the support arm further supporting the shield at the first end, the shield at least partially enclosing the tool member;
    wherein the power tool further comprises a distance member arranged between the frame member and a side portion of the shield and the distance member extends in a plane defined by the distance member at right angles to the drive shaft;
    wherein a peripheral edge portion of the distance member is spaced a predetermined distance from the shield along a direction parallel to a rotational axis of the drive shaft;

wherein the cover comprises a side surface arranged orthogonal to the rotational axis and facing away from the tool member and a second surface arranged between the side surface and the frame member;

wherein a portion of the second surface extends over at least a part of the outer periphery of the frame member and into contact with the distance member.

12. A power tool comprising:

a support arm, the support arm being elongate and having a first end and a second end that is disposed opposite the first end, the support arm comprising a frame member and a cover attached to the frame member via fasteners;

a tool member supported by the support arm at the first end of the support arm, the tool member being driven by a drive shaft;

a shield at least partially enclosing the tool member, the shield being supported by the support arm at the first end of the support arm; and a distance member disposed between the frame member and a portion of a side of the shield, the distance member and a portion of the side of the shield being configured to form a draining channel between the distance member and the portion of the side of the shield;

wherein the frame member and the cover form a belt chamber enclosing a drive belt, a first drive belt pulley, and the drive shaft.

13. The power tool of claim 12, wherein the distance member is in contact with an edge portion of the cover along at least a part of the support arm at the first end of the support arm.

14. The power tool of claim 12, wherein the distance member comprises a lip extending towards the portion of the side of the shield, the lip being disposed on a portion of a periphery of the distance member.

* * * * *